United States Patent
Deimichei et al.

(10) Patent No.: US 12,253,151 B2
(45) Date of Patent: Mar. 18, 2025

(54) GUIDE ASSEMBLY COMPRISING AN ELASTIC ELEMENT

(71) Applicant: DANA ITALIA S.R.L., Trentino (IT)

(72) Inventors: Davide Deimichei, Arco (IT); Carlo Aste, Arco (IT); Viviana Enei, Arco (IT); Efrem Rusconi, Arco (IT)

(73) Assignee: DANA ITALIA S.R.L., Trentino (IT)

( * ) Notice: Subject to any disclaimer, the term of this patent is extended or adjusted under 35 U.S.C. 154(b) by 0 days.

(21) Appl. No.: 18/348,275

(22) Filed: Jul. 6, 2023

(65) Prior Publication Data

US 2024/0011547 A1    Jan. 11, 2024

(30) Foreign Application Priority Data

Jul. 8, 2022 (DE) ............ 20 2022 103 865.1

(51) Int. Cl.
| | | |
|---|---|---|
| *F16H 48/24* | (2006.01) | |
| *F16D 25/04* | (2006.01) | |
| *F16D 25/061* | (2006.01) | |
| *F16H 48/08* | (2006.01) | |

(52) U.S. Cl.
CPC ........... *F16H 48/24* (2013.01); *F16D 25/044* (2013.01); *F16D 25/061* (2013.01); *F16H 48/08* (2013.01)

(58) Field of Classification Search
CPC .......... F16H 48/24; F16H 48/32; F16H 48/27; F16H 48/295; F16D 25/04–048; F16D 25/061
See application file for complete search history.

(56) References Cited

U.S. PATENT DOCUMENTS

| | | | | |
|---|---|---|---|---|
| 1,464,795 | A * | 8/1923 | Woodward | F16H 48/295 475/237 |
| 7,610,996 | B2 * | 11/2009 | Huber | B60T 1/062 188/71.5 |
| 8,382,633 | B2 * | 2/2013 | Cooper | F16H 48/30 475/241 |
| 8,807,296 | B2 * | 8/2014 | Emilsson | F16D 66/02 188/197 |
| 10,808,768 | B2 * | 10/2020 | Creech | F16H 63/32 |
| 10,883,550 | B2 * | 1/2021 | Dempfle | F16D 23/04 |

FOREIGN PATENT DOCUMENTS

| | | | | |
|---|---|---|---|---|
| DE | 4134421 A1 * | 4/1993 | | B60K 17/20 |
| DE | 202020106976 U1 | 3/2022 | | |
| WO | WO-0061972 A1 * | 10/2000 | | F16H 48/08 |

\* cited by examiner

*Primary Examiner* — James J Taylor, II
(74) *Attorney, Agent, or Firm* — McCoy Russell LLP (57) ABSTRACT

A guide assembly, comprising: an outer guide member; an inner guide member at least partially enclosed by the outer guide member, the outer guide member and the inner guide member delimiting a space therebetween; an elastic member disposed in the space, enclosing the inner guide member and being compressible along an axial direction; a support member; and an actuation member configured to axially compress the elastic member against the support member. The inner guide member comprises an axially extending guiding surface facing the elastic member for restricting movement of the elastic member in a radial direction perpendicular to the axial direction. A length of an axial overlap between the guiding surface of the inner guide member and the elastic member is at least two thirds of an axial length of the elastic member.

18 Claims, 7 Drawing Sheets

GUIDE ASSEMBLY COMPRISING AN ELASTIC ELEMENT

CROSS-REFERENCE TO RELATED APPLICATION

The present application claims priority to German Utility Model Application No. 20 2022 103 865.1, entitled "GUIDE ASSEMBLY COMPRISING AN ELASTIC ELEMENT", and filed on Jul. 8, 2022. The entire contents of the above-listed application is hereby incorporated by reference for all purposes.

TECHNICAL FIELD

The present disclosure relates to a guide assembly comprising an elastic element and to a locking differential comprising said guide assembly.

BACKGROUND AND SUMMARY

As a low-stiffness elastic element such as a low-stiffness coil spring or wave spring is compressed along an axial direction, individual coil windings may be displaced in a radial direction perpendicular to the axial direction, which may cause adjacent windings to be jammed and to overlap. Such overlapping can cause lasting damage to the elastic element and impair its functionality. In some applications this problem may be circumvented by using a higher stiffness elastic element. However, in many applications this solution is not feasible.

For example, DE202020106976U1 discloses a locking differential that comprises a side gear, a differential carrier for driving the side gear, a locking member for selectively rotationally locking the side gear to the differential carrier, a piston assembly for actuating the locking member, and an elastic member. Furthermore, in order to rotationally lock the side gear to the differential carrier, the piston assembly is configured to actuate the locking member via the elastic member.

It is an object of the present disclosure to present an assembly that reduces the risk of overlapping of individual windings of an elastic member comprised within a mechanical system.

This objective is achieved by a guide assembly. In one example, the presently proposed guide assembly comprises an outer guide member and an inner guide member at least partially enclosed by the outer guide member, wherein the outer guide member and the inner guide member form and/or delimit a space therebetween. The guide assembly comprises an elastic member disposed in the space, the elastic member enclosing the inner guide member and being compressible along an axial direction. In addition, the guide assembly comprises a support member and an actuation member configured to axially compress the elastic member against the support member. The inner guide member comprises an axially extending guiding surface facing the elastic member for restricting movement of the elastic member in a radial direction perpendicular to the axial direction, wherein a length of an axial overlap between the guiding surface of the inner guide member and the elastic member is at least two thirds of an axial length of the elastic member.

For example, the elastic member may be compressed and released through a relative motion of the support member and the actuation member in the axial direction. Furthermore, the inner guide member and the outer guide member limit a radial displacement of the elastic member, for example when the elastic member is compressed. For instance, the guiding surface of the inner guide member may act as a rigid constraint and limit a radial displacement of the elastic member directed towards the inner guide member. Similarly, the outer guide member may serve as a rigid constraint limiting radial displacement of the elastic member directed towards the outer guide member. The above described length of an axial overlap between the guiding surface of the inner guide member and the elastic member may be useful in cases where coil overlapping can be expected to occur, in the axial direction, mainly at the center of the elastic member. As a result, the guide assembly provides a compact, cheap, and easily assemblable solution which can reduce the risk of coil overlapping.

The elastic member may comprise a compression spring such as a coil spring or a wave spring. Alternatively, the elastic member may be a compression spring such as a coil spring or a wave spring. The elastic member may enclose the inner guide member only partially.

The inner guide member may be made of or may comprise metal or plastic.

The length of the axial overlap between the guiding surface of the inner guide member and the elastic member may be at least 90 percent or 100 percent of the axial length of the elastic member. This design may be useful when coil overlapping can be expected to occur also outside an axially central area of the elastic member.

The actuation member may be configured to be moved between a first axial position in which the elastic member has a maximum axial length and a second axial position in which the elastic member has a minimum axial length, wherein the length of the axial overlap between the guiding surface of the inner guide member and the elastic member is at least two thirds, at least 90 percent, or 100 percent of the maximum axial length of the elastic member. Here, the maximum axial length and the minimum axial length of the elastic member typically do not refer to a minimum extension and to a maximum extension of the elastic member itself. Rather, they may refer to a minimum extension and to a maximum extension or length which the elastic member may assume or take on within the guide assembly. For example, the minimum extension of the elastic member may correspond to a minimum axial distance between the actuation member and the support member, and the maximum extension of the elastic member may correspond to a maximum axial distance between the actuation member and the support member.

In the following, embodiments of the guide assembly will be described that comprise differently shaped guiding surfaces.

In one embodiment, the guiding surface of the inner guide member is rotationally symmetric with respect to a symmetry axis extending in the axial direction.

In another embodiment, the guiding surface of the inner guide member is, additionally or alternatively, cylindrically symmetric with respect to the symmetry axis.

In some of these embodiments, the inner guide member is, additionally or alternatively, a full solid body. In alternative embodiments, the inner guide member may comprise a through-hole in the axial direction, for example.

In yet other embodiments, the outer guide member may also take on different forms, which will be described in the following.

For example, in some embodiments, a radially inner surface of the outer guide member that faces the elastic member is, additionally or alternatively, rotationally symmetric with respect to a symmetry axis extending in the axial direction.

In some of those embodiments, the radially inner surface of the outer guide member is, additionally or alternatively, rotationally symmetric with respect to a symmetry axis extending in the axial direction.

In yet other of those embodiments, the radially inner surface of the outer guide member has, additionally or alternatively, an axial overlap with the elastic member that is at least two thirds, at least 90 percent or 100 percent of an axial extension of the elastic member.

In yet other of those embodiments, the radially inner surface of the outer guide member is, additionally or alternatively, cylindrically symmetric with respect to the symmetry axis.

In a further embodiment, the inner guide member has, additionally or alternatively, an annular or sleeve-like or tubular shape. A part of an outer surface of the tube then usually forms the guiding surface.

In other embodiments, the inner guide member and the outer guide member are, additionally or alternatively, positioned within a certain distance from the elastic member.

In one of those embodiments, the elastic member extends over at least one half or over at least two thirds of a radial extension of the space formed between and/or delimited by the outer guide member and the inner guide member.

In another of those embodiments, a maximum radial distance between the guiding surface and the elastic member is, additionally or alternatively, equal to or smaller than a difference between a maximum outer radius and a minimum inner radius of the elastic member.

In other embodiments of the guide assembly, the inner guide member comprises, additionally or alternatively, a portion that extends radially outward from the guiding surface of the inner guide member and is disposed, along the axial direction, in between the elastic member and the support member. In some of those embodiments, this portion may have a rim-like or flange-like shape.

In another embodiment, the support member, additionally or alternatively, comprises a shoulder portion. A portion of the inner guide member may then be received on the shoulder portion of the support member. This design may facilitate assembly of the guide assembly.

In another embodiment, the guiding surface of the inner guide member, additionally or alternatively, tapers at least in sections along the axial direction in a direction pointing from the support member towards the actuation member. The taper may prevent mechanical interaction between the inner guide member and the actuation member, for example.

In yet another embodiment of the guide assembly, the actuation member, additionally or alternatively, comprises a smallest inner radius that is larger than a greatest outer radius of the guiding surface of the inner guide member.

In the following, embodiments concerning different configurations of the actuation member are described.

In one of those embodiments, the actuation member has an annular shape.

In another one of those embodiments, the outer guide member and the actuation member are, additionally or alternatively, mechanically connected.

In yet another of those embodiments, the actuation member, additionally or alternatively, comprises a snap ring received in an annular indentation formed on a radially inner side of the outer guide member.

A second aspect of the disclosure relates to a locking differential, wherein the locking differential comprises a side gear,
a differential carrier for driving the side gear, and
a locking member for selectively rotationally locking the side gear to the differential carrier.

Moreover, the locking differential comprises the above-described guide assembly, wherein in order to rotationally lock the side gear to the differential carrier the actuation member is configured to actuate the locking member via the elastic member and the support member.

Embodiments of the presently proposed guide assembly and locking differential are described in the following detailed description and are illustrated in the figures.

DETAILED DESCRIPTION

Figure 7:
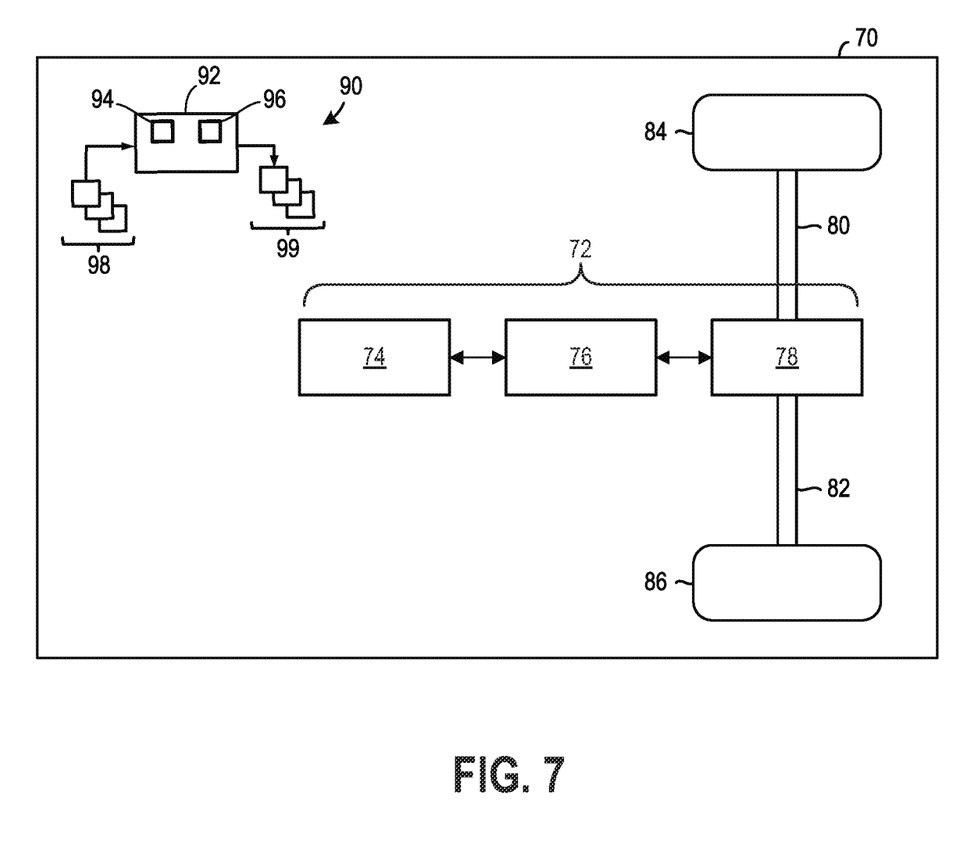
FIG. 7 shows a schematic view of a vehicle including the locking differential of FIG. 1.

FIG. 7 schematically illustrates a vehicle 70 with a powertrain 72 according the present disclosure. The vehicle may take a variety of forms in different embodiments such as a light, medium, or heavy duty vehicle. To generate power, the powertrain 72 may comprise a motive power source 74. The power source may include an internal combustion engine, electric motor, combinations thereof, or other suitable device designed to generate rotational energy. The internal combustion engine may include conventional components such as cylinder(s), piston(s), valves, a fuel delivery system, an intake system, an exhaust system, etc. Further, the electric motor may include conventional components such as a rotor, a stator, a housing, and the like for generating mechanical power as well as electrical power during a regeneration mode, in some cases. As such, the powertrain may be utilized in a hybrid or electric vehicle (e.g., battery electric vehicle). Therefore, the powertrain may have a parallel, a series, or a series-parallel hybrid configuration, in certain instances. In other examples, however, the vehicle may solely use an internal combustion engine for power generation.

The motive power source 74 may provide mechanical power to the differential 78 via a transmission 76. The power path may continue through the differential 78 to drive wheels 84 and 86 by way of axle shafts 80, and 82, respectively. As such, the differential 78 distributes rotational driving force, received from transmission 76, to the drive wheels 84, 86 of axle shafts 80, 82, respectively, during certain operating conditions.

The transmission 76 has a gear reduction that provides a speed-torque conversion functionality. To elaborate, the transmission 76 may be a shiftable gearbox, a continuously variable transmission, an infinitely variable transmission, and the like. The transmission may make use of mechanical components such as shafts, gears, bearings and the like to accomplish the aforementioned gear reduction functionality.

The differential 78 is designed to permit speed deviation between the axle shafts 80 and 82 during certain conditions, such as cornering. Differential 78 may be a locking differential, configured to force axel shafts 80 and 82 to rotate at an equal speed, thereby allowing a different amount of torque to be applied by drive wheel 84 and drive wheel 86. It may be desirable to lock a differential when a traction under drive wheel 84 is different from a traction under drive wheel 86.

The vehicle 70 may include a control system 90 with a controller 92. The controller 92 may include a processor 94 and a memory 96 holding instructions stored therein that when executed by the processor cause the controller 92 to perform various methods, control techniques, etc. described herein. The processor may include a microprocessor unit and/or other types of circuits. The memory may include known data and storage mediums such as random access memory, read only memory, keep alive memory, combinations thereof, etc. The memory may further include non-transitory memory.

The control system 90 may receive various signals from sensors 98 positioned in different locations in the vehicle 70 and the powertrain 72. Additionally, the controller 92 may send control signals to various actuators 99 coupled at different locations in the vehicle and powertrain. For example, the controller 92 may send signals to the motive power source 74. Responsive to receiving the command signal, an actuator in the motive power source may adjust output speed or torque. Other controllable components in the vehicle and transmission system may function in a similar manner with regard to receiving command signals and actuator adjustment. For instance, controller 92 may receiver a signal from sensors 98 to that cause controller 92 to actuate actuators to change differential 78 from an open state to a locked state.

Figure 1:
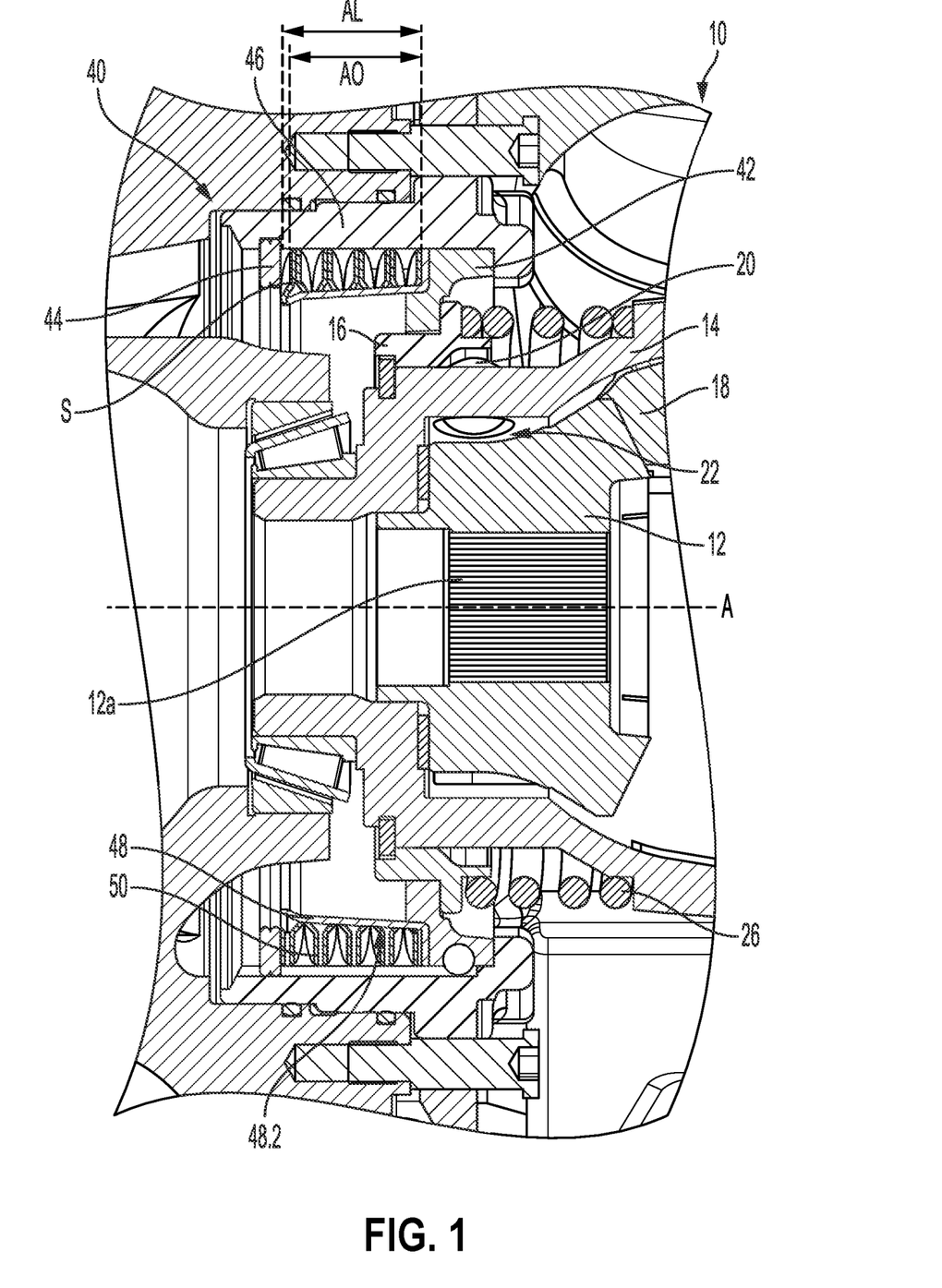
FIG. 1 shows a cross section of a first locking differential with a guide assembly according to the present disclosure, wherein the guide assembly comprises a wave spring.

Turning now to FIG. 1, it shows a cross section of a first locking differential 10 (e.g., differential 78 of FIG. 7) with a guide assembly 40 according to the present disclosure, wherein the guide assembly comprises a wave spring 50.

The guide assembly 40 is comprised in the locking differential 10. The locking differential 10 includes a differential carrier 14 holding a spider gear 18 and a side gear 12 configured to be connected to an axle half shaft (e.g., drive axel 80 or drive axel 82 of FIG. 7) via a splined connection 12a. In one example, spider gear 18 may be configured to engage with side gear 12. Furthermore, the locking differential 10 comprises a locking member 16 configured to move along an axis A defining an axial direction. When locking member 16 is moved along the axial direction towards the spider gear 18, the locking member 16 pushes an engagement member 20 through a recess 22 into a structure (not visible in the figures) that is part of the side gear 12 and, as a result, locks the side gear 12 to the differential carrier 14. In the embodiment of the locking differential shown in FIG. 1, a return spring 26 biases the locking member 16. The guide assembly 40 is part of an assembly that is configured to move the engagement member 20 into the recess 22.

The guide assembly 40 comprises, as an elastic member, the wave spring 50. The guide assembly 40 further comprises an outer guide member 46 and an inner guide member 48. The outer guide member 46 encloses the inner guide member 48, thereby delimiting a space S therebetween. The elastic member 50 is disposed or located in or within the space S. Furthermore, the guide assembly 40 comprises a support member 42 and an actuation member 44. The actuation member 44 is configured to axially compress the elastic member 50 against the support member 42. For instance, in the embodiment of the guide assembly shown in FIG. 1, along the axial direction the wave spring 50 is disposed or situated in between the support member 42 and the actuation member 44.

Additionally, the inner guide member 48 comprises an axially extending guiding surface 48.2 facing the elastic member 50 for restricting movement of the elastic member 50 in a radial direction perpendicular to the axial direction. Moreover, a length AO of an axial overlap between the guiding surface 48.2 of the inner guide member 48 and the elastic member 50 is at least two thirds of an axial length AL of the elastic member. In the embodiment of the guide assembly 40 shown in FIG. 1, the axial overlap AO is approximately 95% of the axial length AL of the wave spring 50.

The guide assembly 40 shown in FIG. 1 will be described in the following in more detail with reference to FIG. 2 and FIG. 3.

Figure 2:
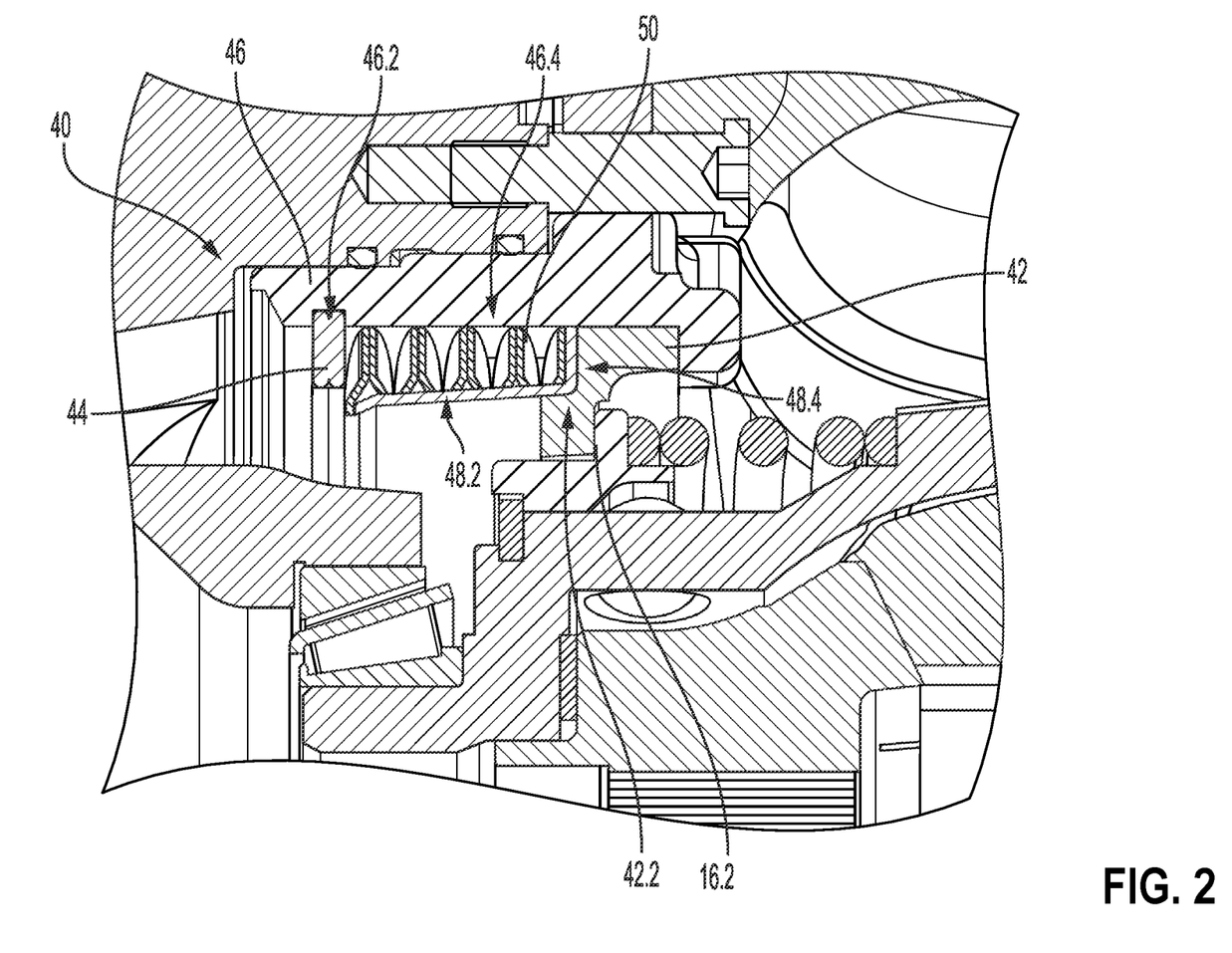
FIG. 2 shows a detailed view of the cross section of the locking differential of FIG. 1 in which the wave spring is an a state of minimum compression.

FIG. 2 shows a detailed view of the cross section of the locking differential 10 of FIG. 1 in which the wave spring 50 is in a state of minimum compression.

Here and in all of the following, features recurring in different figures are designated with the same reference signs. Additionally, the description of the figures will focus mainly on those parts that have not been introduced previously. For a more detailed description of a part that has been introduced before, the reader is referred to the description of the figure in which the part was first shown and labelled.

Figure 3:
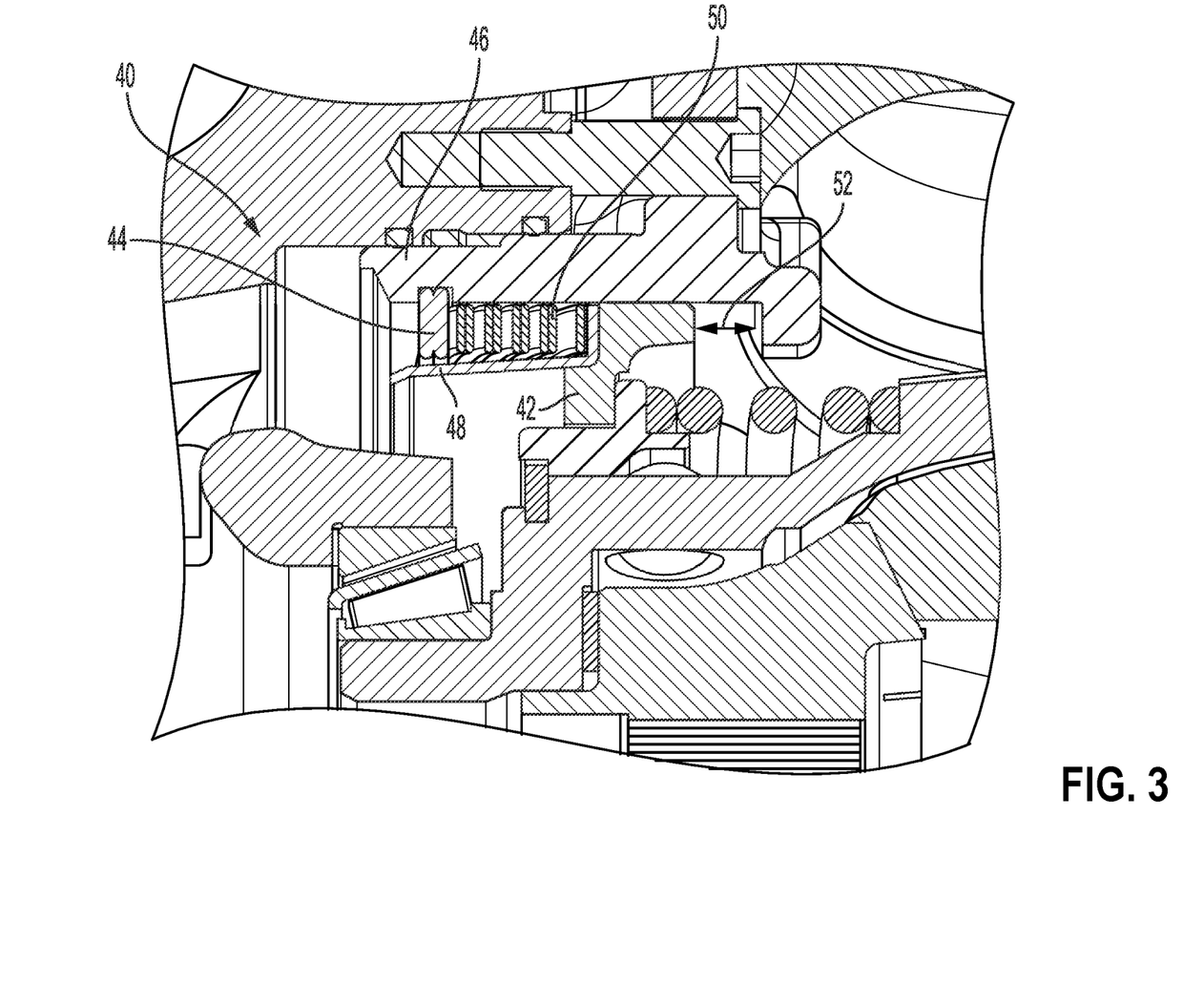
FIG. 3 shows another detailed view of the cross section of the locking differential of FIG. 1 in which the wave spring is in a compressed state.

In the embodiment of the guide assembly shown in FIGS. 1-3, the inner guide member 48 has an annular or sleeve-like shape. In addition, the inner guide member 48 comprises a portion 48.4 that is extending radially outward from the guiding surface 48.2. In the embodiment of the guide assembly shown in FIGS. 1-3, the portion 48.4 that is extending radially outward is a flange. As a result, the cross section of the inner guide member 48 has an L-shape. In addition, the support member 42 comprises a shoulder 42.2, which is fitted to receive the flange 48.4. Further, in an example, the locking member 16 may comprise a shoulder 16.2, which is fitted to receive the support member 42.

In different embodiments of the guide assembly according to this disclosure, the outer guide member 46 and the actuation member 44 are mechanically connected. In the embodiment of the guide assembly shown in FIGS. 1-3, the actuation member 44 is a snap ring that is received in an annular indentation 46.2 formed on a radially inner side 46.4 of the outer guide member 46. For instance, actuation member 44 and outer guide member 46 form a piston.

Under normal operating conditions, the piston is moved hydraulically along the axial direction towards the locking member 16. In this way, the locking member 16 via the actuation member 44, the wave spring 50, and the support member 42 may engage locking member 16 which forces the engagement member 20 into a recess 22 formed in the differential carrier 14. As long as the engagement member 20 can move into the recess 22, the wave spring 50 remains in a state of minimum compression. However, in certain situations the engagement member 20 may be hindered from being received in the structure of the side gear 12. The engagement member 20 then blocks further axial movement of the locking member 16, causing the piston including the outer guide member 46 and the actuation member 44 to compress the wave spring 50. This situation will be described in the following with reference to FIG. 3.

FIG. 3 shows another detailed view of the cross section of the locking differential 10 of FIG. 1 in which the wave spring 50 is in a compressed state.

As described above, compressing the wave spring 50 assists in limiting damage in situations where the engagement member 20 is blocked from moving into the structure of the side gear 12. In such an example, support member 42 may be axially spaced apart by distance 52 from outer guide member 46. Without the wave spring 50, a build-up in hydraulic pressure may damage sealing elements or mechanical parts, for example. In the locking differential 10, the build-up of hydraulic pressure can be reduced via compression of the wave spring 50, as shown in FIG. 3.

To prevent individual windings of the wave spring 50 from jamming or overlapping as the wave spring 50 is compressed, the wave spring 50 is placed, in the radial direction, between the outer guide member 46 and the inner guide member 48.

In the embodiment of the guide assembly shown in FIGS. 1-3, the guiding surface 48.2 of the inner guide member 48 is rotationally symmetric with respect to the axis A. Likewise, also a radially inner surface 46.4 of the outer guide member 46 is rotationally symmetric with respect to the axis A. Both, the inner guide member 48 and the outer guide member 46 are annularly shaped and enclose an axially extending hollow or through hole through which an axle half shaft can be inserted into the side gear 12. Furthermore, the guiding surface 48.2 of the inner guide member 48 is tapered in the axial direction, so that at or near the support member 42 the guiding surface 48.2 is closer, in radial direction, to the wave spring 50 than it is at or near the actuation member 44. The taper of the guiding surface 48.2 prevents the actuation member 44 from damaging the inner guide member 48 when or as the actuation member 44 compresses the wave spring 50.

In other embodiments of the guide assembly, the elastic member may not be a wave spring. An alternative realization of the elastic member will be described in the following with reference to FIGS. 4-6.

Figure 4:
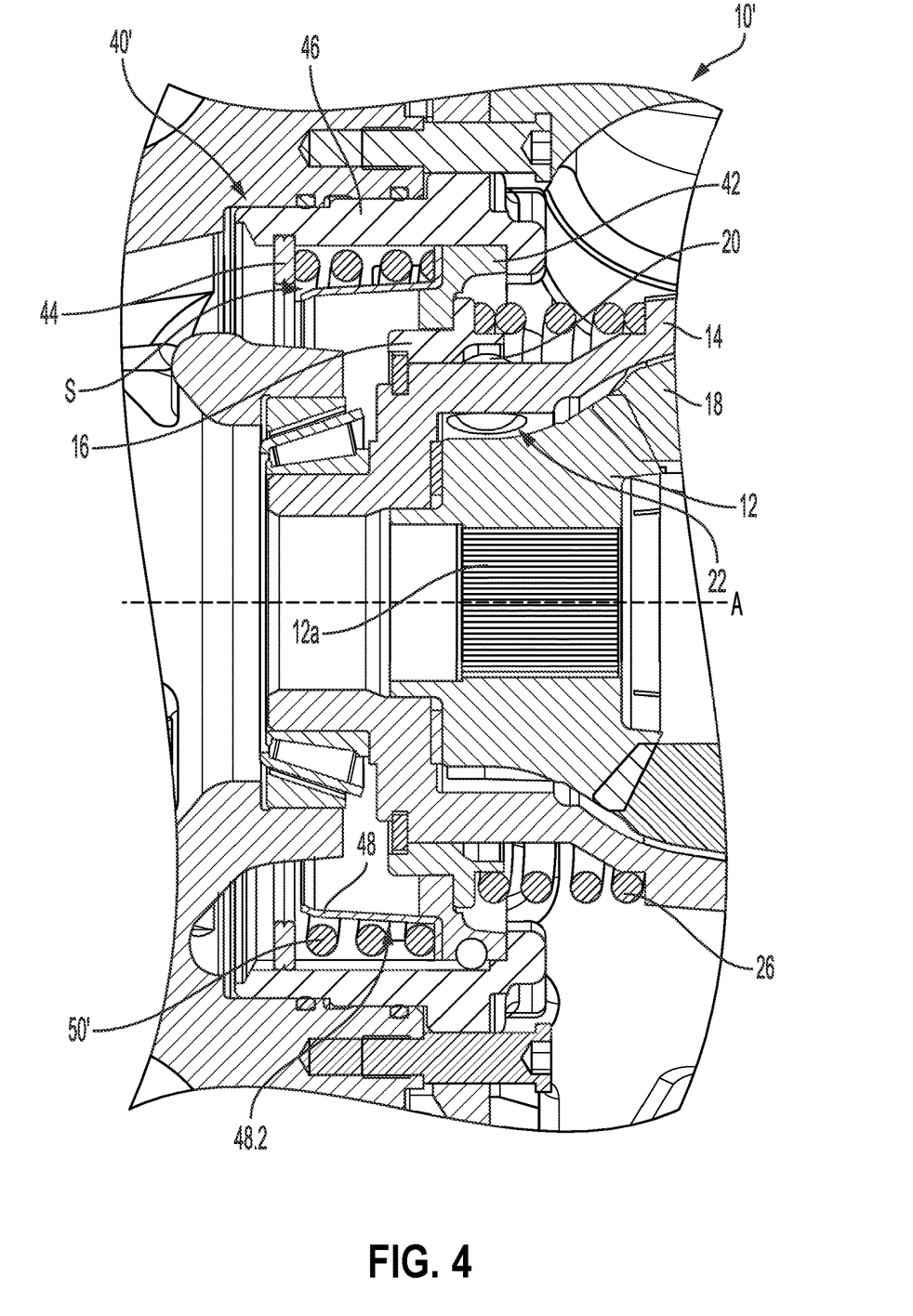
FIG. 4 shows a cross section of a second locking differential with a guide assembly according to the present disclosure, wherein the guide assembly comprises a coil spring.

FIG. 4 shows a cross section of a second locking differential 10' with a guide assembly 40' according to the present disclosure, wherein the guide assembly comprises a coil spring 50' rather than the wave spring 50 shown in FIGS. 1-3. Otherwise, the locking differential 10' is identical to the locking differential 10 of FIGS. 1-3.

Figure 5:
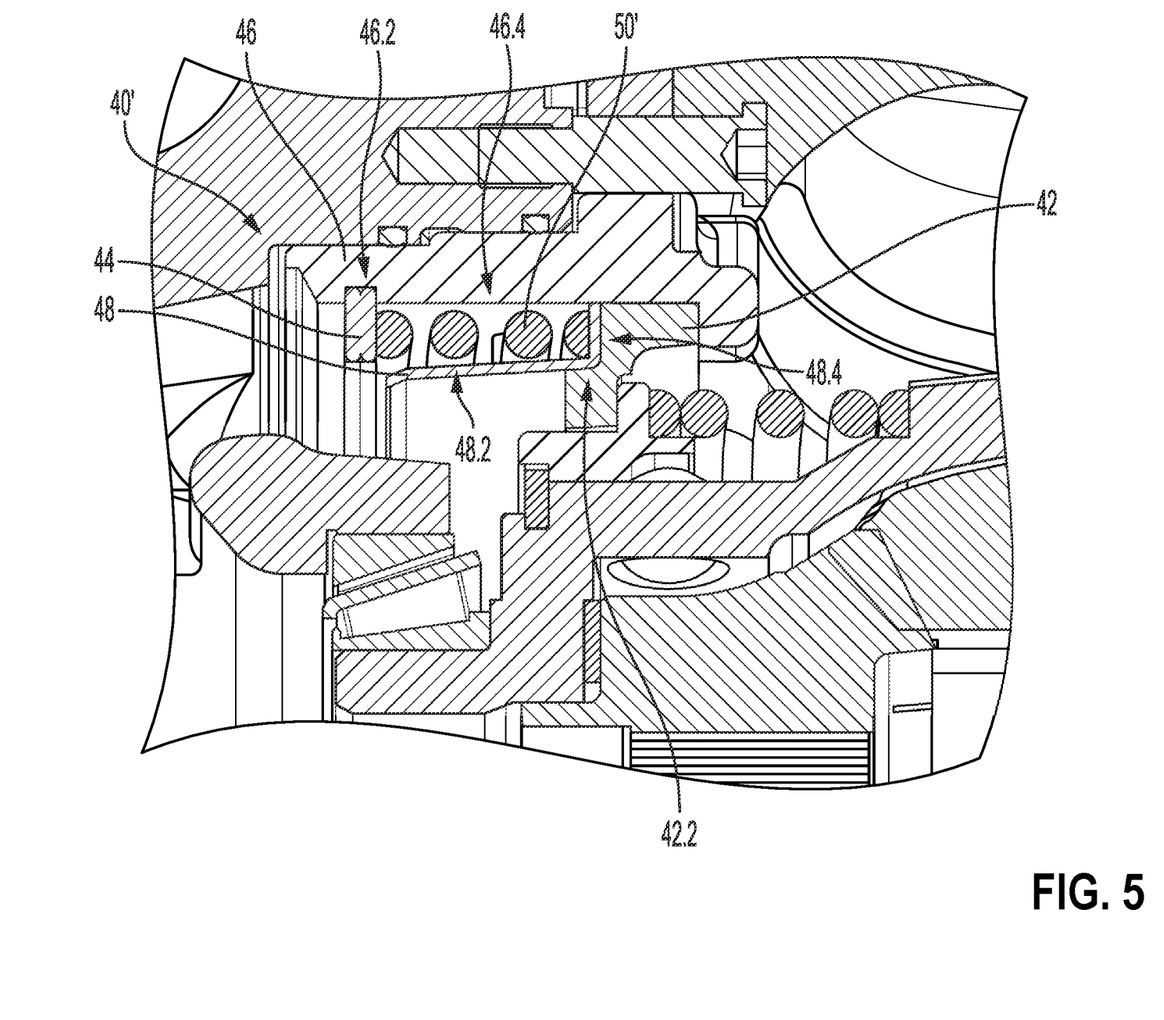
FIG. 5 shows a detailed view of the cross section of the locking differential of FIG. 4 in which the coil spring is in a state of minimum compression.

FIG. 5 shows a detailed view of the locking differential of FIG. 4 in which the coil spring is in a state of minimum compression.

Figure 6:
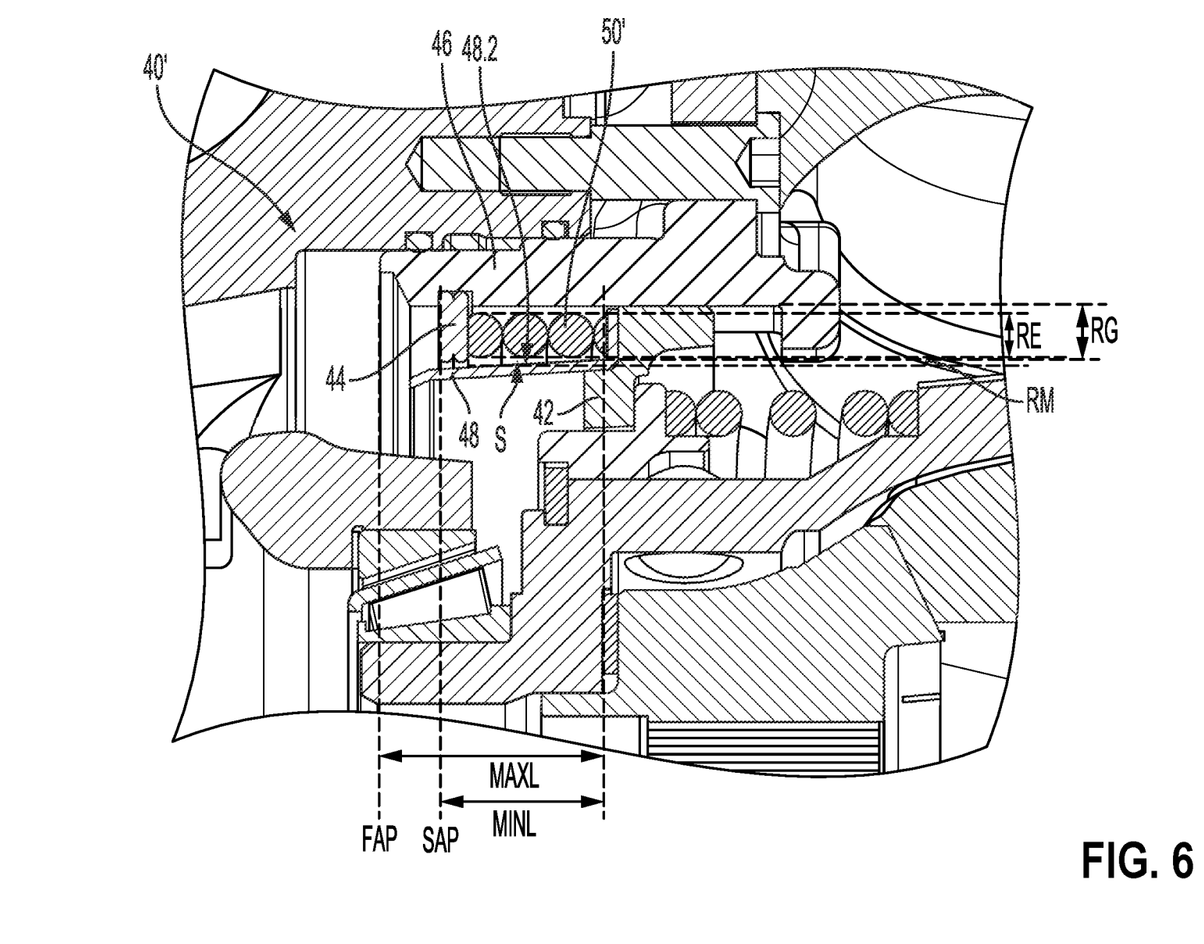
FIG. 6 shows a detailed view of the cross section of the locking differential of FIG. 4 in which the coil spring is in a compressed state.

FIG. 6 shows another detailed view of the locking differential of FIG. 4 in which the coil spring is in a compressed state.

As shown in FIG. 6, the actuation member 44 is configured to move axially between a first axial position FAP in which the elastic member 50' has a maximum axial length MAXL and a second axial position SAP in which the elastic member 50' has a minimum axial length MINL. In the embodiment shown in FIGS. 4-6, the axial overlap between the guiding surface 48.2 and the elastic member 50' is approximately 95% of the maximum axial length MAXL.

Also shown in FIG. 6 is a comparison between a radial extension RE of the elastic element 50' and a radial extension RS of the space S delimited by the inner guide member 48 and the outer guide member 46, wherein the elastic member 50' extends over at least two thirds, for instance over approximately ⅘, of the radial extension RS of the space S. Furthermore, a maximum radial distance RM between the guiding surface 48.2 and the elastic member is equal to or smaller than a difference RE between a maximum outer radius and a minimum inner radius of the elastic member 50'.

While FIGS. 1-6 show the guide assembly comprised within a locking differential, the guide assembly is not limited to this application. In general, the guide assembly can be used within any mechanical system which comprises an elastic member.

The disclosure also provides support for a guide assembly, comprising: an outer guide member, an inner guide member at least partially enclosed by the outer guide member, the outer guide member and the inner guide member delimiting a space therebetween, an elastic member disposed in the space, enclosing the inner guide member and being compressible along an axial direction, a support member, and an actuation member configured to axially compress the elastic member against the support member, wherein the inner guide member comprises an axially extending guiding surface facing the elastic member for restricting movement of the elastic member in a radial direction perpendicular to the axial direction, wherein a length of an axial overlap between the guiding surface of the inner guide member and the elastic member is at least two thirds of an axial length of the elastic member. In a first example of the system, the elastic member comprises a compression spring such as a coil spring or a wave spring. In a second example of the system, optionally including the first example, the length of the axial overlap between the guiding surface of the inner guide member and the elastic member is at least 90 percent or 100 percent of the axial length of the elastic member. In a third example of the system, optionally including one or both of the first and second examples, the actuation member is configured to be moved between a first axial position in which the elastic member has a maximum axial length and a second axial position in which the elastic member has a minimum axial length, wherein the length of the axial overlap between the guiding surface of the inner guide member and the elastic member is at least two thirds, at least 90 percent, or 100 percent of the maximum axial length of the elastic member. In a fourth example of the system, optionally including one or more or each of the first through third examples, the guiding surface of the inner guide member is rotationally symmetric with respect to a symmetry axis extending in the axial direction. In a fifth example of the system, optionally including one or more or each of the first through fourth examples, the guiding surface of the inner guide member is cylindrically symmetric with respect to a symmetry axis extending in the axial direction. In a sixth example of the system, optionally including one or more or each of the first through fifth examples, radially inner surface of the outer guide member is rotationally symmetric with respect to a symmetry axis extending in the axial direction. In a seventh example of the system, optionally including one or more or each of the first through sixth examples, the radially inner surface of the outer guide member is cylindrically symmetric with respect to the symmetry axis. In a eighth example of the system, optionally including one or more or each of the first through seventh examples, the inner guide member has an annular or sleeve-like shape. In a ninth example of the system, optionally including one or more or each of the first through eighth examples, the elastic member extends over at least one half or over at least two thirds of a radial extension of the space. In a tenth example of the system, optionally including one or more or each of the first through ninth examples, a maximum radial distance between the guiding surface and the elastic member is equal to or smaller than a difference between a maximum outer radius and a minimum inner radius of the elastic member. In a eleventh example of the system, optionally including one or more or each of the first through tenth examples, a portion of the inner guide member extending radially outward from the guiding surface of the inner guide member is disposed in between the elastic member and the support member along the axial direction. In a twelfth example of the system, optionally including one or more or each of the first through eleventh examples, the guiding surface of the inner guide member tapers at least in sections along the axial direction in a direction pointing from the support member towards the actuation member. In a thirteenth example of the system, optionally including one or more or each of the first through twelfth examples, a smallest inner radius of the actuation member is larger than a greatest outer radius of the guiding surface of the inner guide member. In a fourteenth example of the system, optionally including one or more or each of the first through thirteenth examples, the actuation member has an annular shape. In a fifteenth example of the system, optionally including one or more or each of the first through fourteenth examples, the outer guide member and the actuation member are mechanically connected. In a sixteenth example of the system, optionally including one or more or each of the first through fifteenth examples, the actuation member comprises a snap ring received in an annular indentation formed on a radially inner surface of the outer guide member. In a seventeenth example of the system, optionally including one or more or each of the first through sixteenth examples, the support member comprises a shoulder portion and a portion of the inner guide member is received on the shoulder portion of the support member.

The disclosure also provides support for a locking differential, comprising a side gear, a differential carrier for driving the side gear, a locking member for selectively rotationally locking the side gear to the differential carrier, and a guide assembly of the locking member, including: an outer guide member, an inner guide member at least partially enclosed by the outer guide member, the outer guide member and the inner guide member delimiting a space therebetween, an elastic member disposed in the space, enclosing the inner guide member and being compressible along an axial direction, a support member, and an actuation member configured to axially compress the elastic member against the support member, wherein the inner guide member comprises an axially extending guiding surface facing the elastic member for restricting movement of the elastic member in a radial direction perpendicular to the axial direction, wherein a length of an axial overlap between the guiding surface of the inner guide member and the elastic member is at least two thirds of an axial length of the elastic member, and wherein in order to rotationally lock the side gear to the differential carrier the actuation member is configured to actuate the locking member via the elastic member and the support member.

The disclosure also provides support for a method of operating a locking differential, comprising: moving a piston formed by an outer guide member and an actuation member along an axial direction to a cause axial movement of a locking member to force an engagement member to engage with a recess, and when axial movement of the locking member is hindered, compressing, with the piston, an elastic member disposed in a space delimited by the outer guide member and an inner guide member, wherein the inner guide member comprises an axially extending guiding surface facing the elastic member for restricting movement of the elastic member in a radial direction perpendicular to the axial direction, and wherein compressing the elastic member relieves hydraulic pressure in the locking differential.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 1-6 are drawn approximately to scale, although other dimensions or relative dimensions may be used.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A guide assembly, comprising:
an outer guide member,
an inner guide member at least partially enclosed by the outer guide member, the outer guide member and the inner guide member delimiting a space therebetween, an elastic member disposed in the space, enclosing the inner guide member and being compressible along an axial direction, a support member, wherein a portion of the inner guide member extending radially outward from an axially extending guiding surface of the inner guide member is disposed in between the elastic member and the support member along the axial direction and directly contacts the elastic member and the support member, and an actuation member configured to axially compress the elastic member against the support member, and wherein a smallest inner radius of the actuation member is larger than a greatest outer radius of the axially extending guiding surface of the inner guide member;

wherein the inner guide member comprises the axially extending guiding surface facing the elastic member for restricting movement of the elastic member in a radial direction perpendicular to the axial direction, wherein a length of an axial overlap between the guiding surface of the inner guide member and the elastic member is at least two thirds of an axial length of the elastic member.

2. The guide assembly of claim 1, wherein the elastic member is a compression spring, and wherein the compression spring is a coil spring or a wave spring.

3. The guide assembly of claim 1, wherein the length of the axial overlap between the guiding surface of the inner guide member and the elastic member is at least 90 percent or 100 percent of the axial length of the elastic member.

4. The guide assembly of claim 1, wherein the actuation member is configured to be moved between a first axial position in which the elastic member has a maximum axial length and a second axial position in which the elastic member has a minimum axial length, wherein the length of the axial overlap between the guiding surface of the inner guide member and the elastic member is at least two thirds, at least 90 percent, or 100 percent of the maximum axial length of the elastic member.

5. The guide assembly according to claim 4, wherein the guiding surface of the inner guide member is cylindrically symmetric with respect to a symmetry axis extending in the axial direction.

6. The guide assembly of claim 1, wherein the guiding surface of the inner guide member is rotationally symmetric with respect to a symmetry axis extending in the axial direction.

7. The guide assembly of claim 1, wherein a radially inner surface of the outer guide member is rotationally symmetric with respect to a symmetry axis extending in the axial direction.

8. The guide assembly of claim 7, wherein the radially inner surface of the outer guide member is cylindrically symmetric with respect to the symmetry axis.

9. The guide assembly of claim 1, wherein the inner guide member has an annular or sleeve shape.

10. The guide assembly of claim 1, wherein the elastic member extends over at least one half or over at least two thirds of a radial extension of the space.

11. The guide assembly of claim 1, wherein a maximum radial distance between the guiding surface and the elastic member is equal to or smaller than a difference between a maximum outer radius and a minimum inner radius of the elastic member.

12. The guide assembly of claim 1, wherein the guiding surface of the inner guide member tapers at least in sections along the axial direction in a direction pointing from the support member towards the actuation member.

13. The guide assembly of claim 1, wherein the actuation member has an annular shape.

14. The guide assembly of claim 13, wherein the actuation member is a snap ring received in an annular indentation formed on a radially inner surface of the outer guide member.

15. The guide assembly of claim 1, wherein the outer guide member and the actuation member are mechanically connected.

16. The guide assembly of claim 1, wherein the support member comprises a shoulder portion and a portion of the inner guide member is received on the shoulder portion of the support member.

17. A locking differential, comprising:
a side gear,
a differential carrier for driving the side gear,
a locking member for selectively rotationally locking the side gear to the differential carrier, and
a guide assembly of the locking member, including:
an outer guide member,
an inner guide member at least partially enclosed by the outer guide member, the outer guide member and the inner guide member delimiting a space therebetween,
an elastic member disposed in the space, enclosing the inner guide member and being compressible along an axial direction,
a support member, wherein the support member comprises a shoulder fitted to receive a flange portion of the inner guide member, the flange portion extending radially outward from an axially extending guiding surface of the inner guide member, and
an actuation member configured to axially compress the elastic member against the support member;
wherein the inner guide member comprises the axially extending guiding surface facing the elastic member for restricting movement of the elastic member in a radial direction perpendicular to the axial direction, wherein a length of an axial overlap between the guiding surface of the inner guide member and the elastic member is at least two thirds of an axial length of the elastic member; and
wherein in order to rotationally lock the side gear to the differential carrier the actuation member is configured to actuate the locking member via the elastic member and the support member.

18. A guide assembly, comprising:
an outer guide member,
an inner guide member at least partially enclosed by the outer guide member, the outer guide member and the inner guide member delimiting a space therebetween,
an elastic member disposed in the space, enclosing the inner guide member and being compressible along an axial direction,
a support member, wherein a portion of the inner guide member extending radially outward from an axially extending guiding surface of the inner guide member is disposed in between the elastic member and the support member along the axial direction and directly contacts the elastic member and the support member wherein the support member comprises a shoulder portion and a portion of the inner guide member is received on the shoulder portion of the support member; and
an actuation member configured to axially compress the elastic member against the support member;
wherein the inner guide member comprises the axially extending guiding surface facing the elastic member for restricting movement of the elastic member in a radial direction perpendicular to the axial direction, wherein a length of an axial overlap between the guiding surface of the inner guide member and the elastic member is at least two thirds of an axial length of the elastic member.

* * * * *